(12) United States Patent
Chae et al.

(10) Patent No.: US 11,329,312 B2
(45) Date of Patent: May 10, 2022

(54) PRE-LITHIATION APPARATUS, METHOD OF PRODUCING NEGATIVE ELECTRODE UNIT AND NEGATIVE ELECTRODE UNIT

(71) Applicant: LG CHEM, LTD., Seoul (KR)

(72) Inventors: Oh Byong Chae, Daejeon (KR); Yoon Ah Kang, Seoul (KR); Jun Hyuk Song, Daejeon (KR); Eun Kyung Kim, Daejeon (KR); Sang Wook Woo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 229 days.

(21) Appl. No.: 16/500,276

(22) PCT Filed: Dec. 29, 2017

(86) PCT No.: PCT/KR2017/015755
§ 371 (c)(1),
(2) Date: Oct. 2, 2019

(87) PCT Pub. No.: WO2018/186561
PCT Pub. Date: Oct. 11, 2018

(65) Prior Publication Data
US 2021/0135274 A1 May 6, 2021

(30) Foreign Application Priority Data

Apr. 3, 2017 (KR) .................. 10-2017-0043030
Dec. 26, 2017 (KR) .................. 10-2017-0179905

(51) Int. Cl.
*H01M 10/0525* (2010.01)
*H01M 4/04* (2006.01)
(Continued)

(52) U.S. Cl.
CPC ..... *H01M 10/0525* (2013.01); *H01M 4/0409* (2013.01); *H01M 4/131* (2013.01);
(Continued)

(58) Field of Classification Search
None
See application file for complete search history.

(56) References Cited

U.S. PATENT DOCUMENTS 4,897,917 A   2/1990  Gauthier et al.
6,171,729 B1  1/2001  Gan et al.
(Continued)

FOREIGN PATENT DOCUMENTS

CN   105190958 A   12/2015
CN   205552696 U    9/2018
(Continued)

OTHER PUBLICATIONS

Machine translation of JPH06-150935 (Year: 1994).*
(Continued)

*Primary Examiner* — Wyatt P McConnell
(74) *Attorney, Agent, or Firm* — Birch, Stewart, Kolasch & Birch, LLP (57) ABSTRACT

A pre-lithiation apparatus that pre-lithiates a negative electrode structure having a first surface on which a negative electrode is disposed to produce a negative electrode unit of a battery, the apparatus includes a first roll rotatable to wind or unwind the negative electrode structure before the pre-lithiation is performed, a second roll installed to be spaced apart from the first roll and rotatable to wind and collect the negative electrode structure, on which the pre-lithiation is performed, and a lithium roll crossing a direction in which the negative electrode structure is transferred from the first roll to the second roll to come into contact with at least one of a first surface and a second surface of the negative (Continued)

electrode structure while being transferred from the first roll to the second roll. The lithium roll includes a lithium foil and an elastic member.

20 Claims, 8 Drawing Sheets (51) Int. Cl.
    *H01M 4/131* (2010.01)
    *H01M 4/134* (2010.01)
    *H01M 4/36* (2006.01)
    *H01M 4/66* (2006.01)
    *H01M 4/02* (2006.01)

(52) U.S. Cl.
    CPC ........... *H01M 4/134* (2013.01); *H01M 4/366* (2013.01); *H01M 4/661* (2013.01); *H01M 2004/021* (2013.01); *H01M 2004/027* (2013.01)

(56) References Cited

U.S. PATENT DOCUMENTS

| | | |
|---|---|---|
| 2012/0295155 A1 | 11/2012 | Deng et al. |
| 2013/0045427 A1 | 2/2013 | Zhamu et al. |
| 2015/0017543 A1 | 1/2015 | Lee et al. |
| 2016/0141596 A1 | 5/2016 | Uhm et al. |

FOREIGN PATENT DOCUMENTS

| | | | |
|---|---|---|---|
| JP | 6-124709 A | | 5/1994 |
| JP | 6-150935 A | | 5/1994 |
| JP | H06-150935 | * | 5/1994 |
| JP | 10-289708 A | | 10/1998 |
| JP | 11-86847 A | | 3/1999 |
| JP | 2003-297430 A | | 10/2003 |
| JP | 2008-243656 A | | 10/2008 |
| KR | 10-0291067 B1 | | 6/2001 |
| KR | 10-2006-0056969 A | | 5/2006 |
| KR | 10-1204539 B1 | | 11/2012 |
| KR | 10-1406267 B1 | | 6/2014 |
| KR | 10-1538079 B1 | | 7/2015 |
| KR | 10-1594784 B1 | | 2/2016 |
| WO | WO 2016/210249 A1 | | 12/2016 |

OTHER PUBLICATIONS

Extended European Search Report, dated Mar. 25, 2020, for European Application No. 17904750.1.
International Search Report (PCT/ISA/210) issued in PCT/KR2017/015755, dated May 9, 2018.

* cited by examiner

PRE-LITHIATION APPARATUS, METHOD OF PRODUCING NEGATIVE ELECTRODE UNIT AND NEGATIVE ELECTRODE UNIT

TECHNICAL FIELD

The present invention relates to a pre-lithiation apparatus, a method of producing a negative electrode unit by using the same, and a negative electrode unit, and more particularly, to a pre-lithiation apparatus that is capable of improving production yield and quality of a negative electrode unit, a method of manufacturing a negative electrode unit by using the same, and a negative electrode unit.

BACKGROUND ART

Recently, with the rapid spread of electronic apparatuses using batteries such as mobile phones, notebook computers, electric vehicles, and the like, demands for secondary batteries that are small and lightweight and have relatively high capacity have been rapidly increasing.

Generally, a secondary battery includes a positive electrode and a negative electrode, which are spaced apart from each other, and a separator disposed the positive electrode and the negative electrode and coated with an electrolyte. Such a secondary battery is a battery that produces electric energy through oxidation and reduction reactions when ions are intercalated into or deintercalated from a positive electrode and a negative electrode in a state in which an electrolyte is filled between the negative electrode and the positive electrode, each of which has an active material layer in which the ions are capable of being intercalated or deintercalated.

An electrode of a secondary battery, i.e., each of a positive electrode and a negative electrode includes a collector and an active material layer applied to the collector. In general, a lithium secondary battery includes a collector including a first collector made of aluminum, a positive electrode active material layer formed on the first collector and containing lithium such as $LiCoO_2$ and $LiMn_2O_4$, and a negative electrode made of copper, and an active material layer applied on the collector and made of a carbon-based material, e.g., graphite.

In the carbon-based negative electrode active material layer, a solid electrolyte interface (SEI) layer is formed on a surface of the negative electrode active layer during an initial charging/discharging process (activation process). As a result, an initial irreversible phenomenon occurs, and also, the battery is reduced in capacity due to depletion of the electrolyte while the SEI layer is collapsed and regenerated during the continuous charging/discharging process.

To solve the capacity reduction problem associated with the carbon-based negative electrode active material layer, a technology in which a silicon oxide (SiO) material having an effective capacity of 10 times or more as compared with the carbon-based material is applied to the negative electrode active material layer has been developed in recent years due to an increase in demand for a high-capacity secondary battery. However, problems such as reduction in the total capacity of the battery and degradation in the cycle lifetime occur also as ever because of the large initial irreversible reaction.

To solve these problems, studies with respect to a method for attempting pre-lithiation on the negative electrode active material layer made of the silicon oxide-based material to change oxygen existing in the silicon oxide-based material into lithium oxide are being actively carried out. According to this method, the initial irreversible reaction of the silicon oxide-based material may be reduced to improve the lifetime.

In the method of performing the pre-lithiation on the negative electrode active material layer, a negative electrode is blanked or cut to have a predetermined length or a predetermined area, and a lithium-containing thin plate is disposed to face the negative electrode, and then, power is applied to dope lithium ions of the metal-containing thin plate into the negative electrode. The pre-lithiation method takes several days, e.g., ten days or more to uniformly dope the lithium ions over the negative electrode.

Also, as described above, since the large-area negative electrode is blanked or cut to form the plurality of negative electrodes, each of which has a predetermined area less than that of the large-area negative electrode, and the plurality of blanked (or cut) negative electrodes are individually immersed in a bath to perform the pre-lithiation, it takes a long time to perform the pre-lithiation on the plurality of electrodes and thereby to deteriorate a production rate.

(Patent Document 1) Korean Patent Publication No. 2006-0056969

DISCLOSURE OF THE INVENTION

Technical Problem

The present invention provides a pre-lithiation apparatus that is capable of reducing a manufacturing time of a negative electrode unit, which includes a pre-lithiation process, and a method of producing a negative electrode unit by using the same.

The present invention provides a pre-lithiation apparatus that is capable of improving quality of a pre-lithiated negative electrode unit, a method of producing a negative electrode unit by using the same, and a negative electrode unit.

Technical Solution

The present invention provides a pre-lithiation apparatus that pre-lithiates a negative electrode structure having a first surface on which a negative electrode is disposed to produce a negative electrode unit of a battery, the pre-lithiation apparatus including: a first roll rotatable to wind or unwind the negative electrode structure therearound or therefrom before the pre-lithiation is performed; a second roll installed to be spaced apart from the first roll and rotatable to wind and collect the negative electrode structure, on which the pre-lithiation is performed, therearound; and a lithium roll crossing a direction in which the negative electrode structure is transferred from the first roll to the second roll and disposed between the first roll and the second roll to come into contact with at least one of a first surface and a second surface of the negative electrode structure while being transferred from the first roll to the second roll, wherein the lithium roll includes: a lithium foil on which a lithium film for pre-lithiating the negative electrode is formed on an outer circumferential surface thereof, and an elastic member having elasticity located under the lithium foil.

The lithium roll may include a rotation body that is rotatable as the negative electrode structure is transferred, the elastic member may be installed to surround an outer circumferential surface of the rotation body, and the lithium foil may be disposed to surround an outer circumferential surface of the elastic member.

The elastic member may include a silicon pad.

The lithium foil may include a support extending along an outer circumferential surface of the elastic member to surround the outer circumferential surface of the elastic member, and the lithium film may be disposed on an entire one surface of the support.

The lithium foil may include a support extending along an outer circumferential surface of the elastic member to surround the outer circumferential surface of the elastic member, and the lithium film may be provided as a plurality of lithium films discontinuously disposed on one surface of the support to constitute a pattern.

Each of the plurality of lithium films may have surface area corresponding to a surface area of the negative electrode unit to be produced.

Each of the plurality of lithium films may have a surface area less than a surface area of the negative electrode unit to be produced, and a plurality of discontinuous lithium films of the plurality of lithium films may be disposed on an individual area corresponding to the negative electrode unit on the support.

The present invention provides a method of producing a negative electrode unit of a secondary battery, the method including: a negative electrode structure transfer process of transferring a negative electrode structure, in which a negative electrode is formed, in one direction so that an electrolyte is provided on a collector formed to extend in the one direction; a negative electrode pre-lithiation process of allowing at least one surface of the negative electrode to come into contact with a lithium film formed on an outer circumferential surface of a lithium roll while transferring the negative electrode structure to pre-lithiate the negative electrode of the negative electrode structure; and a negative electrode unit formation process of cutting the negative electrode structure on which the pre-lithiation of the negative electrode is performed to produce a plurality of negative electrode units, wherein, in the pre-lithiation process, an elastic member disposed inside the lithium roll is pressed in a direction towards a rotation axis of the lithium roll according to a thickness of one surface of the negative electrode coming into contact with the lithium film to minimize a gap between the at least one surface of the negative electrode and the lithium film.

The lithium film may be continuoulsy formed and, in the negative electrode pre-lithiation process, the contact between the at least one surface of the negative electrode and the lithium film may be performed by allowing the at least one surface of the negative electrode to come into contact with the continuously formed lithium film.

In the lithium contact process, the continuously formed lithium film may be continuously formed on the outer circumferential surface of the lithium roll installed on a path along which the negative electrode structure is transferred.

In the negative electrode pre-lithiation process, a pre-lithiated area that is patterned so that pre-lithiated areas and non-pre-lithiated areas are alternately repeated may be formed on the one surface of the negative electrode.

The formation of the patterned pre-lithiated area may be performed so that the negative electrode structure transferred in the one direction comes into contact with the lithium roll on which the lithium films is provided in plurality and that are discontinuously patterned on the outer circumferential surface of the lithium roll are formed to form a plurality of discontinuous pre-lithiated areas on the negative electrode structure.

Each of the plurality of pre-lithiated areas may have a surface area corresponding to that of the negative electrode unit to be produced.

Each of the plurality of lithium films may have a surface area less than that of the negative electrode unit to be produced, and in the negative electrode structure, a pattern of the pre-lithiated areas may be formed so that pre-lithiated areas and non-pre-lithiated areas are alternately repeated several times within an individual area corresponding to the negative electrode unit to be produced.

The negative electrode of the negative electrode structure may be made of a material including silicon oxide (SiO).

The present invention provides a negative electrode unit of a secondary battery, including: a collector having a predetermined area; and a negative electrode coated with silicon oxide on at least one surface of the collector and including an electrolyte, wherein at least one surface of the negative electrode is discontinuously pre-lithiated so that lithiated areas and non-pre-lithiated areas of the negative electrode are alternately repeated several times.

The negative electrode may be made of a material including silicon oxide (SiO).

Advantageous Effects

The pre-lithiation apparatus according to the embodiment of the present invention may be used to reduce the process time for pre-lithiating the negative electrode when compared with the related art, and thus, to improve the production rate.

Also, the lithium roll may include the elastic member to uniformly perform the pre-lithiation without the gap.

Also, the negative electrode structure may be pre-lithiated in the patterning manner to reduce the amount of lithium consumed in the lithium roll by reducing the pre-lithiation of the area except for the area used as the negative electrode unit of the battery.

Also, the negative electrode structure may be pre-lithiated in the pattering manner to perform the discontinuous pre-lithiation, thereby preventing the electrode from being expanded in volume due to the excessive pre-lithiation at the specific position according to the thickness of the electrode during the pre-lithiation.

MODE FOR CARRYING OUT THE INVENTION

Hereinafter, embodiments will be described in detail with reference to the accompanying drawings. The present invention may, however, be embodied in different forms and should not be construed as limited to the embodiments set forth herein. Rather, these embodiments are provided so that the present invention will be thorough and complete, and will fully convey the scope of the present invention to those skilled in the art. In the figures, like reference numerals refer to like elements throughout.

The present invention relates to a pre-lithiation apparatus that is capable of reducing a decrease in battery capacity or improving the capacity, a method of producing a negative electrode unit by using the same, and a negative electrode unit. Also, the present invention relates to a pre-lithiation apparatus that is capable of pre-lithiating a negative electrode to improve capacity and thereby decreasing a production time of the negative electrode and improving production yield, a method of producing a negative electrode unit by using the same, and a negative electrode unit.

Figure 1:
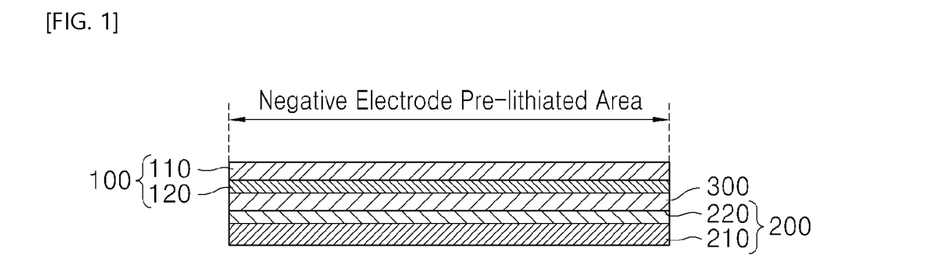
FIG. 1 is a schematic conceptual view of a secondary battery according to a first embodiment, which includes a negative electrode that is pre-lithiated through a method according to the first embodiment of the present invention.
Figure 2:
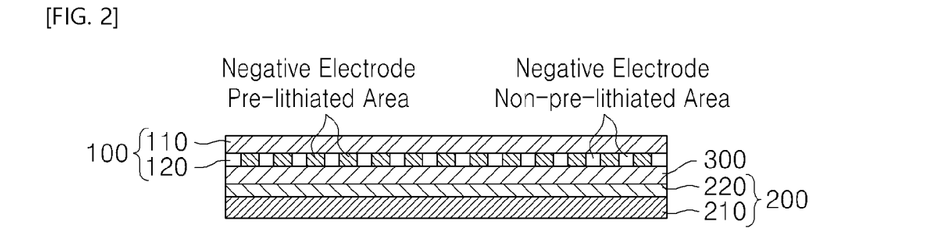
FIG. 2 is a schematic conceptual view of a secondary battery including a negative electrode that is pre-lithiated through a method according to a second embodiment of the present invention.

FIG. 1 is a schematic conceptual view of a secondary battery including a negative electrode that is pre-lithiated through a method according to the first embodiment of the present invention. FIG. 2 is a schematic conceptual view of a secondary battery including a negative electrode that is pre-lithiated through a method according to a second embodiment of the present invention. More particularly, FIG. is a schematic conceptual view of a secondary battery including a negative electrode that is pre-lithiated through a method according to a modified example of a second embodiment.

First, referring to FIGS. 1 and 2, a secondary battery including a pre-lithiated negative electrode will be described. Hereinafter, a lithium secondary battery will be described as an example of a secondary battery to be described in an embodiment.

A secondary battery according to an embodiment, i.e., a lithium secondary battery includes first and second collectors 210 and 110 facing each other and spaced apart from each other, a positive electrode 220 and a negative electrode 120, which face each other and are spaced apart from each other between the first collector 210 and the second collector 110, and a separator 300 disposed between the positive electrode 220 and the negative electrode 120.

The first collector 210 has a predetermined area and thickness and is made of a metal thin plate, e.g., an Al thin plate, which has conductivity without causing a chemical change in the corresponding battery. The first collector 210 may be formed by depositing an Al thin film on one surface of a conductive support through a method such as sputtering or formed through electroplating or electroless plating. The first collector 210 may be formed of various materials in addition to the Al thin plate, for example, at least one of Ni, C, Cu, STS (stainless steel), Ti, Cr, Mn, Fe, Co, Zn, Mo, W, Ag, and Au. Also, the first collector 210 according an embodiment may have a thickness of 3 μm to 500 μm, but is not limited thereto. For example, a thin plate having various thicknesses according to specification of the secondary battery to be manufactured may be used as the first collector 210. Also, the first collector 210 has an uneven surface to improve bonding strength with a positive electrode active material layer and be manufactured in various forms such as a film, a sheet, foil, a net porous body, a foam body, and a non-woven fabric.

The positive electrode 220 may be applied to or formed on one surface of the first collector 210 facing the separator 300, be a layer including a positive electrode active material that is capable of reversibly intercalating or deintercalating lithium ions, and be called a positive electrode active material layer. The positive electrode active material used as the positive electrode 220 may be formed of at least one of $LiCoO_2$, $LiNiO_2$, $LiNiCoO_2$, $LiMn_2O_4$, $LiFeO_2$, $V_2O_5$, $V_6O_{13}$, TIS, and MoS. The positive electrode 220 formed as the positive electrode active material layer may be formed by applying the positive electrode active material on one surface of the first collector 210 facing the separator 300, for example, may have a thickness of 50 μm to 100 μm. The thickness of the positive electrode 220 is not limited to the range of 50 μm to 100 μm, and thus may have various thicknesses according to specifications of the secondary battery to be manufactured.

The separator 300 is disposed between the positive electrode 220 and the negative electrode 120. In the secondary battery, the positive electrode and the negative electrode 120 are prevented from physically coming into contact with each other to prevent sudden discharge from occurring due to electrical short or prevent the secondary battery from being fired or exploded due to heat generated by the electrical short. It is preferable that an insulative thin film having high ion permeability and mechanical strength is used as the separator 300. For example, a sheet or non-woven fabric formed of an olefin-based polymer such as polypropylene, a glass fiber, or polyethylene, which has chemical resistance and hydrophobicity, may be used as the separator. Also, the separator 300 may generally have a thickness of 5 μm to 300 μm.

An electrolyte may be provided or impregnated in at least one of inner or outer portions of the separator 300. An inorganic solid electrolyte, an organic solid electrolyte, a non-aqueous organic solvent, or the like may be used as the electrolyte. When a solid electrolyte such as a polymer is used as the electrolyte, the solid electrolyte may also function as the separator.

For example, the inorganic solid electrolyte may include a Li-based nitride such as $Li_3N$, LiI, $Li_5NI_2$, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$, a halide, or a sulfate.

For example, the organic solid electrolyte may include a copolymer including a polyethylene derivative, a polyethylene oxide derivative, a polypropylene oxide derivative, a phosphoric acid ester polymer, poly agitation lysine, polyester sulfide, polyvinyl alcohol, poly vinylidene fluoride, or an ionic disintegrator.

For example, the non-aqueous organic solvent may include an aprotic organic solvent such as N-methyl-2-pyrrolidone, propylene carbonate, ethylene carbonate, butylene carbonate, dimethyl carbonate, diethyle carbonate, gamma-butyrolacton, 1,2-dimethoxy ethane, tetrahydroxy franc, 2-methyl tetrahydrofuran, dimethyl sulfoxide, 1,3-dioxolane, formamide, dimethyl formamide, dioxolane, acetonitrile, nitromethane, methyl formate, methyl acetate, phosphoric acid tri-ester, trimethoxy methane, dioxolane derivatives, sulfolan, methyl sulfolan, 1,3-dimethyl-2-imidazolidinone, a propylene carbonate derivative, a tetrahydrofuran derivative, ether, methyl propionate, and ethyl propionate.

The second collector 110 may have a predetermined area and size, i.e., have a predetermined thickness to provide a flexible property and be made of a metal thin plate or a Cu thin plate, which has conductivity without causing a chemical change in the corresponding battery. The second collector 110 may be formed by depositing a Cu thin film on one surface of a conductive support through a method such as sputtering or formed through electroplating or electroless plating. The second collector 110 may be formed of various materials in addition to the Al thin plate, for example, at least one of STS (stainless steel), Al, Ni, Ti, C, Cr, Mn, Fe, Co, Zn, Mo, W, Ag, and Au. Also, the second collector 110 according an embodiment may have a thickness of 3 μm to 500 μm, but is not limited thereto. For example, a thin plate having various thicknesses according to specification of the secondary battery to be manufactured may be used as the first collector.

As described above, the second collector 110 may have a predetermined thickness to provide a flexible property, for example, the metal thin plate may have a film, a sheet, or a foil shape. Also, the second collector 110 may have flexibility and may be applied in various forms such as a net porous body, a foam body, and a non-woven fabric.

The negative electrode 120 may be applied to or formed on one surface of the second collector 110 facing the separator 300 and be a layer including a negative electrode active material that is capable of reversibly intercalating or deintercalating lithium ions while maintaining structural and electrical properties. Although a carbon-based material is used in the related art, in an embodiment of the present invention, a silicon oxide (SiO) material having an effective capacity greater ten times or more than that of the carbon-based material is applied to the negative electrode active material layer, i.e., the negative electrode 120 to improve the capacity of the battery. The negative electrode 120 is formed by applying the negative electrode active material on one surface of the second collector 110 facing the separator 300, for example, may have a thickness of 50 μm to 100 μm. The thickness of the negative electrode is not limited to the range of 50 μm to 100 μm, and thus may have various thicknesses according to specifications of the secondary battery to be manufactured.

Also, an electrolyte including lithium ions (Li+) is impregnated or provided in the negative electrode 120, i.e., the negative electrode active material layer. For this, in an embodiment, the second collector 110 including the negative electrode 120 may be immersed or dipped into a bath containing electrolyte salts including lithium ion ($Li^+$). Here, the electrolyte salts may include at least one of $LiPF_6$, $LiBF_4$, $LiSbF_6$, $LiAsF_5$, $LiClO_4$, LiN, $LiN(SO_2CF_3)_2$, $LiN(SO_2C_2F_5)$ $LiC(SO_2CF_3)_2$, $LiPF_4(CF_3)_2$, $LiPF_3(C_2F_5)_3$, $LiPF_3(CF_3)_3$.

As described above, a laminated structure of the second collector 110 and the negative electrode 120 may have a thickness of several μm to several hundreds μm and have a flexible property.

The negative electrode 120 according to an embodiment of the present invention is formed by applying the negative electrode active material layer made of the silicon oxide (SiO) material. After the negative electrode 120 contains the electrolyte, the negative electrode 120 is pre-lithiated through a below-described method according to a embodiment. Here, the pre-lithiation means reaction or action in which the negative electrode active material forming the negative electrode 120, i.e., silicon oxide (SiO) is reduced to form lithium oxide. Here, a voltage of a unit providing lithium ions from the outside is 0 V, and the negative electrode 120 itself has a predetermined voltage, for example, 3 V. Thus, the lithium ions supplied from the outside by a potential difference thereof are injected through the electrolyte of the negative electrode 120, and silicon oxide (SIO) that is the negative electrode active material reacts with the lithium ions to perform the reduction reaction, thereby forming the lithium oxide.

Since the negative electrode 120 or the negative electrode active material layer is pre-lithiated to previously perform a film formation reaction occurring during initial charging, a high-capacity secondary battery may be manufactured without reducing the capacity, and consumption of the lithium ions, which occurs as the number of cycles increase, may be compensated to improve lifetime.

The pre-lithiation of the negative electrode 120 may be performed on an entire surface of the negative electrode as described in the first embodiment of FIG. 1, or as described in the second embodiment of FIG. 2 and FIG. 11 that will be described below, the negative electrode 120 is divided into a plurality of areas, and then a portion of the plurality of areas is pre-lithiated, and the remaining portion of the plurality of areas is not pre-lithiated (hereinafter, referred to as a non-pre-lithiation) so that the plurality of pre-lithiated areas are spaced apart from each other. In other words, the negative electrode 120 includes the plurality of pre-lithiated areas and the remaining non-pre-lithiated areas, wherein the plurality of pre-lithiated areas are spaced apart from each other with the non-pre-lithiated areas therebetween so that the plurality of pre-lithiated areas form a predetermined pattern. The pre-lithiation method may be called a pre-lithiation having a patterned shape or a pre-lithiation pattern.

Also, in the pre-lithiation having the patterned shape or the pre-lithiation pattern as described above, each of the plurality of pre-lithiated areas may have a surface area equal or corresponding to that of a negative electrode unit 100 to be used in the secondary battery to be manufactured (see FIG. 11), or each of the plurality of pre-lithiated areas may have a surface area significantly less than that of the negative electrode unit 100 to be produced (see FIGS. 2 to 15).

In the formation of the negative electrode 120 by applying the negative electrode active material to the second collector 110, a difference in thickness of the areas may occur. Also, when the pre-lithiation is performed on the entire surface or a large area of the negative electrode 120, current charging may be concentrated into a relatively thick portion, and thus, the pre-lithiation may actively or intensively occur to cause a volume expansion due to the formation of a large amount lithium oxide at the above-described position. Thus, a different in thickness of the area on which the pre-lithiation actively or intensively occurs and the area on which the pre-lithiation does not actively or intensively occur is relatively large. Contact failures between the negative electrode 120 and the separator 300 may occur due to the deviation in thickness when the negative electrode 120 and the second collector 110 or the negative electrode 120 and the separator 300 are laminated, and thus, this may have a bad influence on the performance of the secondary battery.

Thus, in an embodiment of the present invention, when the negative electrode 120 is pre-lithiated, the negative electrode 120 may be pre-lithiated so that the plurality of pre-lithiated areas are formed to be discontinuous, thereby preventing or suppressing the phenomenon in which the pre-lithiation relatively largely or intensively occurs at a portion or a specific area of the negative electrode 120. Thus, the thickness deviation for each position or area of the pre-lithiated negative electrode may be reduced. In an embodiment, when the negative electrode is pre-lithiated so that the plurality of pre-lithiated areas are discontinuous, each of the plurality of pre-lithiated areas may have a surface area of 400 $\mu m^2$ or less to more efficiently reduce the thickness deviation.

In an embodiment of the present invention, the large-area negative electrode 120 may be pre-lithiated in a roll-to-roll method that will be described later to reduce a pre-lithiation time of the negative electrode 120, thereby improving production rates of the negative electrode 120 and the secondary battery including the negative electrode 120.

Hereinafter, a pre-lithiation apparatus and method according to embodiments will be described. Here, a structure in which a negative electrode 120 is formed on a second collector 110 by using a negative electrode active material is called a 'negative electrode structure (10)'.

Figure 3:
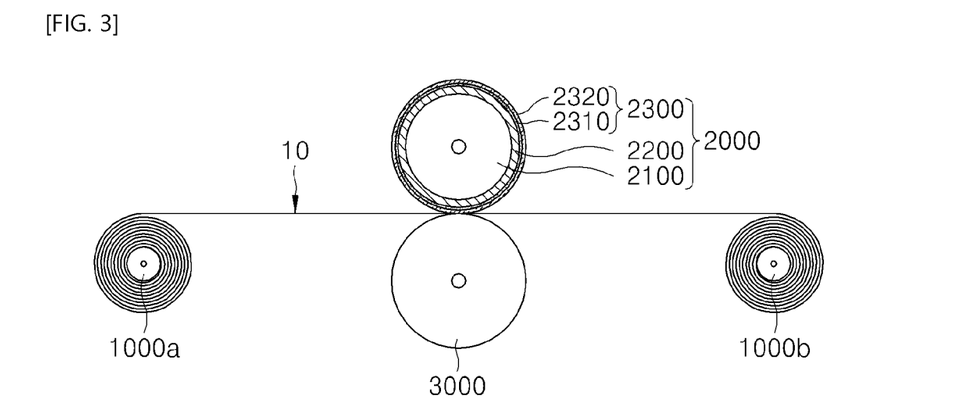
FIG. 3 is a conceptual view of a pre-lithiation apparatus including a lithium roll according to the first embodiment of the present invention.
Figure 4:
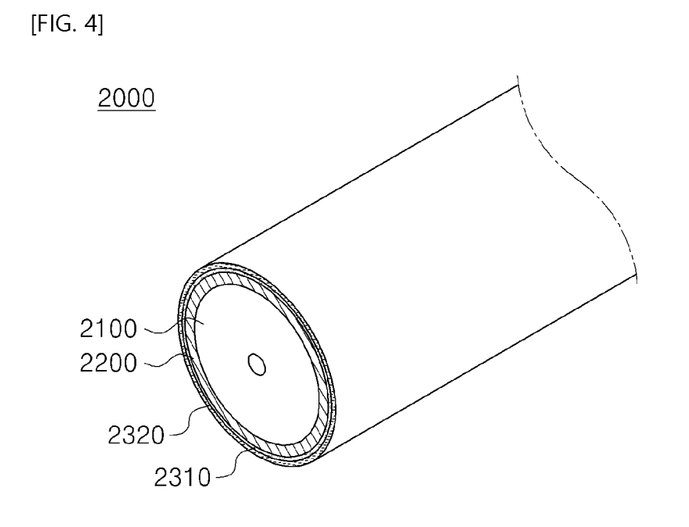
FIG. 4 is a schematic solid view of the lithium roll according to the first embodiment of the present invention.
Figure 5:
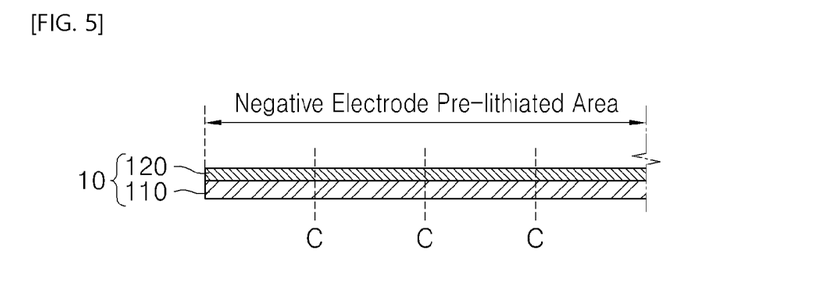
FIG. 5 is a view of a negative electrode structure that is pre-lithiated through the lithium roll according to the first embodiment of the present invention.

FIG. 3 is a conceptual view of a pre-lithiation apparatus including a lithium roll according to the first embodiment of the present invention. FIG. 4 is a schematic solid view of the lithium roll according to the first embodiment of the present invention. FIG. 5 is a view of a negative electrode structure that is pre-lithiated through the lithium roll according to the first embodiment of the present invention. FIG. 6A is a schematic view illustrating a lithium roll which does not include an elastic member and a state during pre-lithiation using the same, and FIG. 6B is a schematic view illustrating a lithium roll including the elastic member and a state during pre-lithiation using the same.

Figure 7:
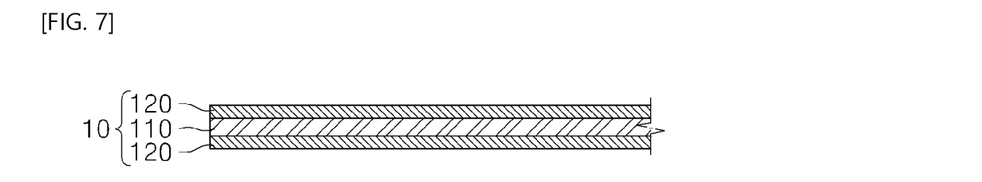
FIG. 7 is a view of a negative electrode structure that is pre-lithiated through a pre-lithiation apparatus according to a modified example of the first embodiment.
Figure 8:
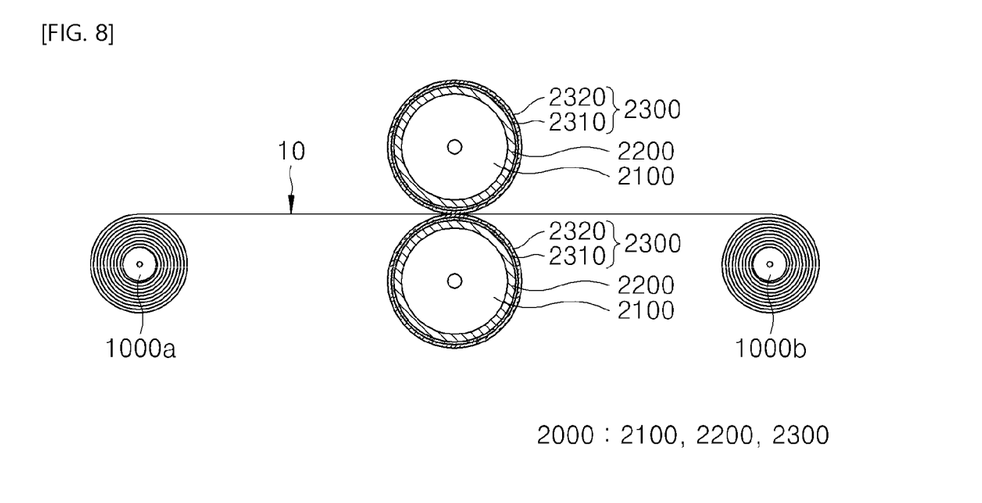
FIG. 8 is a conceptual view of the pre-lithiation apparatus according to the modified example of the first embodiment.

FIG. 7 is a view of a negative electrode structure that is pre-lithiated through a pre-lithiation apparatus according to a modified example of the first embodiment. FIG. 8 is a conceptual view of the pre-lithiation apparatus according to the modified example of the first embodiment.

Figure 9:
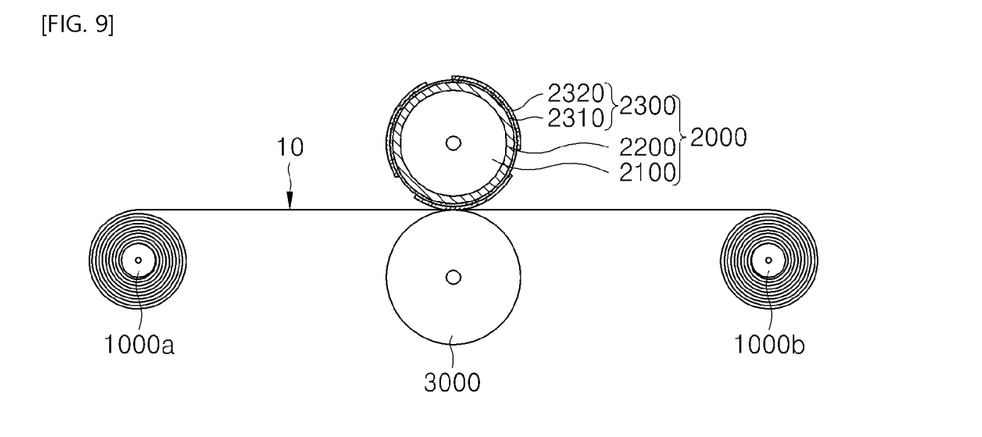
FIG. 9 is a conceptual view of a pre-lithiation apparatus including a lithium roll according to a second embodiment of the present invention.
Figure 10:
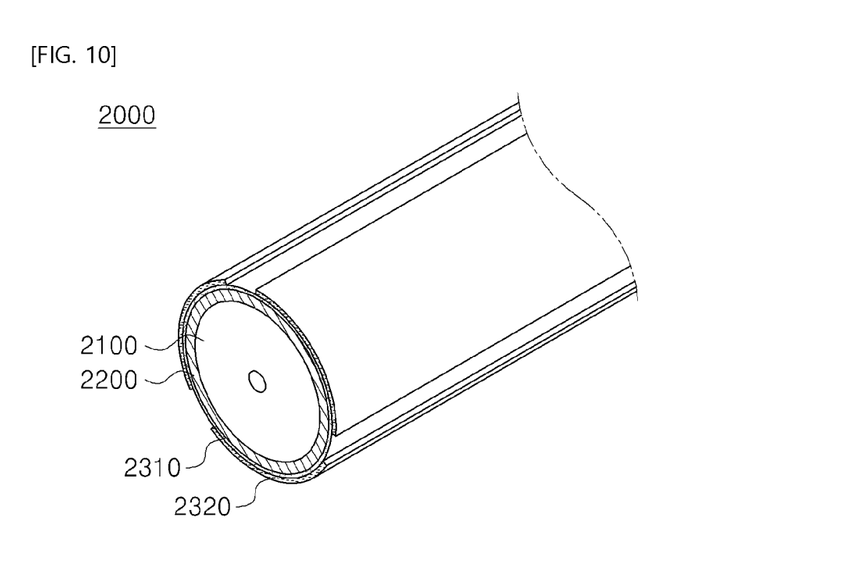
FIG. 10 is a schematic solid view of the lithium roll according to the second embodiment of the present invention.

FIG. 9 is a conceptual view of a pre-lithiation apparatus including a lithium roll according to a second embodiment of the present invention. FIG. 10 is a schematic solid view of the lithium roll according to the second embodiment of the present invention. FIG. 11 is a view of a negative electrode structure that is pre-lithiated through the lithium roll according to the second embodiment of the present invention. FIG. 12 is a conceptual top view illustrating a state before a lithium foil is installed on an electric member according to the second embodiment of the present invention.

Figure 13:
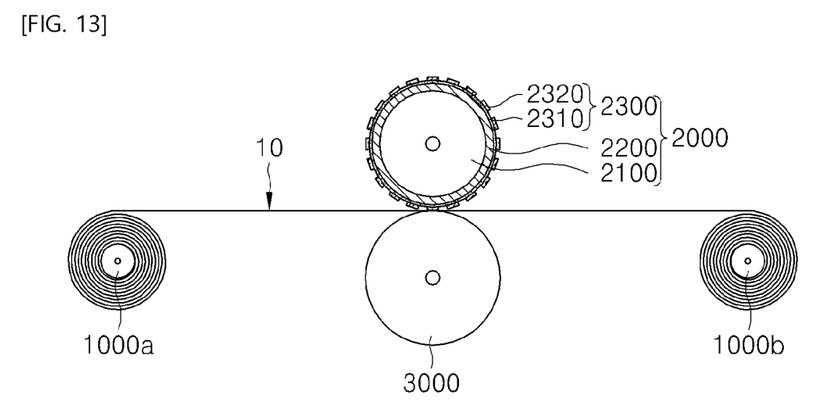
FIG. 13 is a conceptual view of a pre-lithiation apparatus including a lithium roll according to a modified example of the second embodiment.
Figure 14:
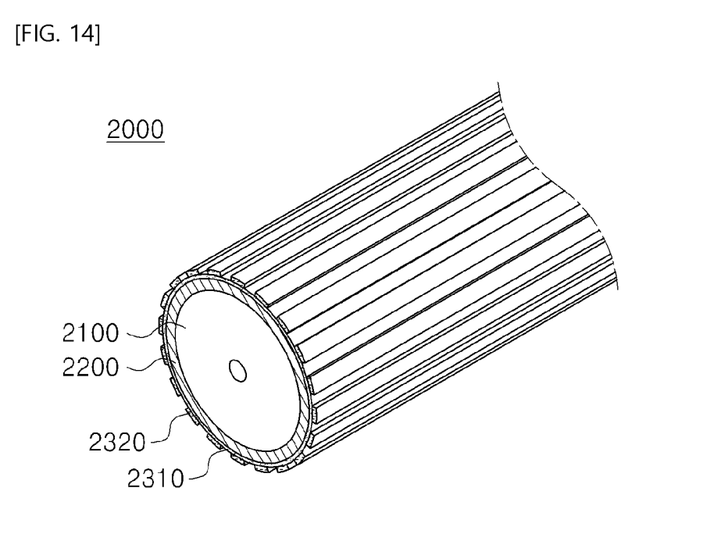
FIG. 14 is a schematic solid view of the lithium roll according to the modified example of the second embodiment.
Figure 15:
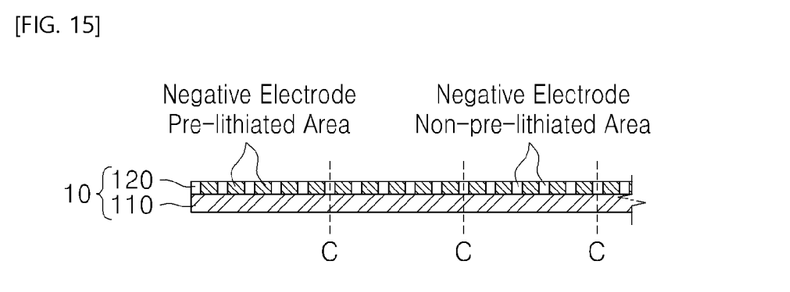
FIG. 15 is a view of a negative electrode structure that is pre-lithiated through the lithium roll according to the modified example of the second embodiment.
Figure 16:
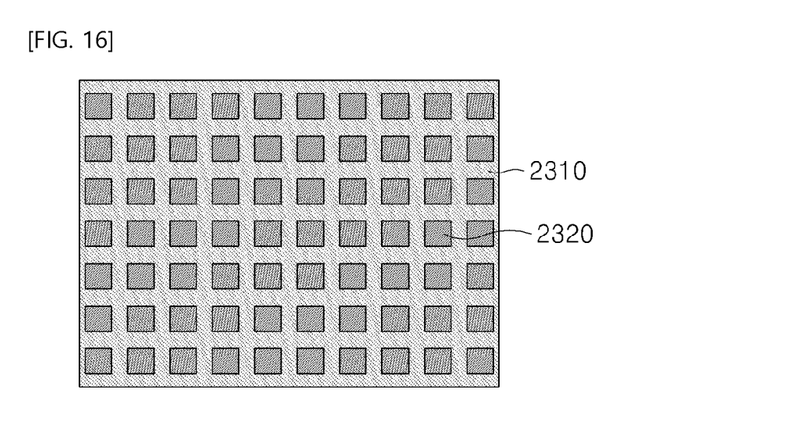
FIG. 16 is a conceptual top view illustrating a state before a lithium foil is installed on an electric member according to the modified example of the second embodiment.
Figure 17:
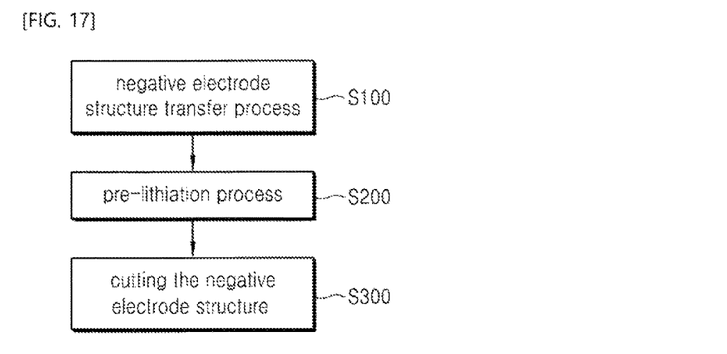
FIG. 17 is a flowchart showing a method for pre-lithiation in accordance with an exemplary embodiment of the present invention.

FIG. 13 is a conceptual view of a pre-lithiation apparatus including a lithium roll according to a modified example of the second embodiment. FIG. 14 is a schematic solid view of the lithium roll according to the modified example of the second embodiment. FIG. 15 is a view of a negative electrode structure that is pre-lithiated through the lithium roll according to the modified example of the second embodiment. FIG. 16 is a conceptual top view illustrating a state before a lithium foil is installed on an electric member according to the modified example of the second embodiment.

Referring to FIG. 3, a pre-lithiation apparatus according to the first embodiment includes a first roll 1000a around which a negative electrode structure 10 is wound before pre-lithiation, a second roll 1000b disposed to be spaced apart from the first roll 1000a to collect the negative electrode structure 10 on which the pre-lithiation is performed, and a roll (hereinafter, referred to as a lithium roll 2000) disposed between the first roll 1000a and the second roll 1000b and installed to come into contact with one surface of a negative electrode 120 when the negative electrode structure 10 unwound from the first roll 1000a is transferred to the second roll 1000b so that lithium ions are provided to the negative electrode 120, and a support roll 3000 disposed to face the lithium roll 2000 in a direction facing a back surface of the negative electrode structure 10. Also, although not shown, the pre-lithiation apparatus may include a driving unit that rotates the first and second rolls 1000a and 1000b.

The negative electrode structure 10 has a configuration in which a negative electrode 120 containing an electrolyte is formed on a large-area second collector 110. The negative electrode structure 10 is tightened or tensioned by the first roll 1000a and the second roll 1000b for the pre-lithiation. An area before the pre-lithiation is performed is wound around the first roll 1000a, and an area on which the pre-lithiation is performed is wound around the second roll 1000b.

The first roll 1000a may be disposed on one side of the lithium roll 2000 and be a roll for waiting the negative electrode structure 10 before the pre-lithiation is performed. That is, the negative electrode structure 10 having a predetermined length may be wound around the first roll 1000a, and the first roll 1000a may rotate to unwind the negative electrode structure 10.

The second roll 1000b may be disposed on the other side of the lithium roll 2000 and be a roll for collecting the negative electrode structure 10 on which the pre-lithiation is performed. That is, the negative electrode structure 10 via the lithium roll 2000 may be wound around the second roll 1000b through rotation of the second roll 1000b.

The lithium roll 2000 is installed and configured to come into contact with one surface of the negative electrode structure 10 during the pre-lithiation while facing the one surface of the negative electrode structure 10 between the first roll 1000a and the second roll 1000b, i.e., a moving path of the negative electrode structure 10. Also, when the negative electrode structure 10 is transferred from the first roll 1000a to the second roll 1000b, since the lithium roll 2000 comes into contact with outer circumferential surfaces of the first and second rolls 1000a and 1000b, the lithium roll 2000 may move together or synchronized with the negative electrode structure 10 to rotate.

As illustrated in FIGS. 3 and 4, the lithium roll 2000 includes a rotation body 2100 extending in a direction that crosses or is perpendicular to a moving direction of the negative electrode structure 10, an elastic member 2200 installed to surround an outer circumferential surface of the rotation body 2100, and a lithium foil 2300 installed to surround an outer circumferential surface of the elastic member 2200 and providing lithium ions.

The rotation body 2100 has a predetermined diameter and a transverse cross-section having a shape that is easily rotatable, i.e., a circular shape.

The elastic member 2200 has elastic force to be deformable and restorable according to application and release of force from the outside. The elastic member 2200 extends in a direction corresponding to the rotation body 2100 to surround the outer circumferential surface of the rotation body 2100. In other words, the elastic member 2200 is manufactured in a hollow shape, and the rotation body 2100 is inserted into an opening of the elastic member 2200. The elastic member 2200 according to an embodiment is provided as a silicon pad, but is not limited thereto. For example, the elastic member 2200 is made of a material that is capable of being installed to surround the outer circumferential surface of the rotation body while having the elasticity, for example, rubber and has various shapes.

The elastic member 2200 may perform pre-lithiation on an entire area of the one surface of the negative electrode 120 without a gap or void.

That is, when a negative electrode active material layer is formed on a second collector 110, it is difficult to form the negative electrode active material layer having the complete same thickness over the entire area. Thus, a thickness difference of the negative electrode active material layer or the negative electrode 120 may occur according to an area of position thereof. In other words, the negative electrode 120 may be formed to relatively protrude for an area or position thereof.

Figure 6:
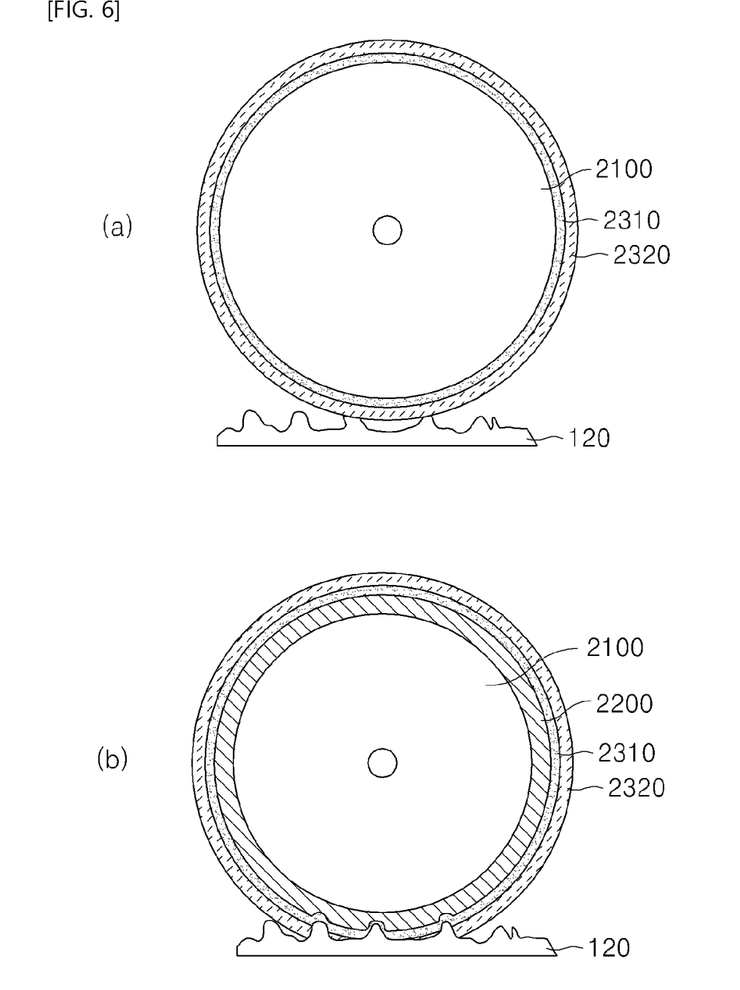
FIG. 6A is a schematic view illustrating a lithium roll which does not include an elastic member and a state during pre-lithiation using the same.
FIG. 6B is a schematic view illustrating a lithium roll including the elastic member and a state during pre-lithiation using the same.

However, for example, as illustrated in FIG. 6, when the lithium roll 2000 does not include the elastic member 2200, when the negative electrode structure 10 moves to a lower side of the lithium roll 2000, only a portion of a negative electrode area disposed to correspond to the lower side of the lithium roll 2000 may come into contact with the lithium foil 2300, and the remaining portion may not come into contact with the lithium foil 2300. Thus, an area on which the pre-lithiation is not performed may occur. When the pre-lithiation process is continuously performed as described above, the pre-lithiation is not uniformly performed on the large-area negative electrode 120.

However, as illustrated in FIG. 6B, in case in which the lithium roll includes the elastic member 2200, when the negative electrode structure 10 moves to the lower side of the lithium roll 2000, the lithium foil 2300 corresponding to a relatively thick area of the area of the negative electrode 120, which corresponds to the lower side of the lithium roll 2000, and the elastic member 2200 are compressed to be recessed inward. Thus, the entire area of the negative electrode 120 corresponding to the lower side of the lithium roll 2000 may come into contact with the lithium foil 2300, and thus, the pre-lithiation may be uniformly performed on the large-area negative electrode 120.

The lithium foil 2300 extends in a direction corresponding to the rotation body 2100 or the elastic member 2200 to surround the outer circumferential surface of the elastic member 2200. The lithium foil 2300 may be formed by depositing, applying, or coating with a lithium film 2320 on one surface of a support 2310 having a flexible thin plate or film shape. In this case, the lithium foil 2300 is mounted on the elastic member 2200 so that the lithium film 2320 is exposed to the outside.

The lithium foil 2300 according to the first embodiment has a structure in which the lithium film 2320 is formed on an entire surface of the support 2310. When the lithium foil 2300 is installed to surround the entire outer circumferential surface of the elastic member 2200, the entire outer circumferential surface of the elastic member 2200 may be surrounded by the lithium film 2320. Also, when the negative electrode 120 is pre-lithiated by using the lithium roll 2000 on which the lithium foil 2300 is formed, the entire one surface of the negative electrode 120 is pre-lithiated as illustrated in FIG. 5.

As illustrated in FIG. 5, in the pre-lithiation on the negative electrode 120 of the negative electrode structure 10, the negative electrode 120 is formed on only one surface of the one surface and a back surface of the second collector 110, and thus, the one surface of the negative electrode 120 is pre-lithiated.

However, this not limited thereto. As described in a modified example of the negative electrode according to the first embodiment of FIG. 7, the negative electrode 120 may be formed on the one surface the back surface of the second collector 110 constituting the negative electrode structure 10, and all the two negative electrodes 120 may be pre-lithiated.

For this, as described in the modified example of FIG. 8, the support roll 3000 may be changed into the lithium roll in the pre-lithiation apparatus according to the first embodiment.

Also, according to the abovementioned first embodiment, in the negative electrode 120 of the negative electrode structure 10 extending in one direction, the pre-lithiation is continuously performed from a starting point to an ending portion of the pre-lithiation (see FIG. 5). Also, for this, as illustrated in FIGS. 3 and 4, the lithium roll on which the lithium film 2320 is formed is used on the entire one surface of the support 2310.

However, the negative electrode 120 may be pre-lithiated without being limited to the abovementioned first embodiment. That is, the pre-lithiation is not continuously performed from the starting point to the ending point of the pre-lithiation of the negative electrode 120, but discontinuously performed.

Figure 11:
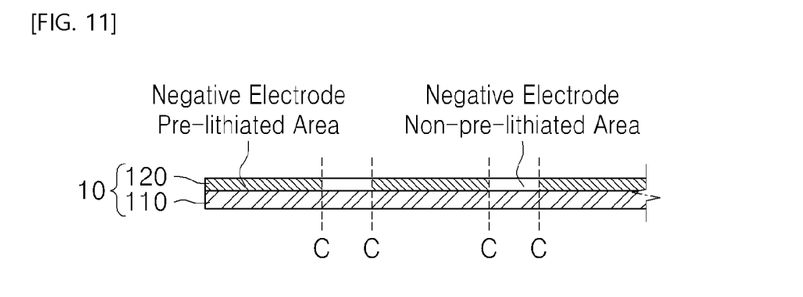
FIG. 11 is a view of a negative electrode structure that is pre-lithiated through the lithium roll according to the second embodiment of the present invention.
Figure 12:
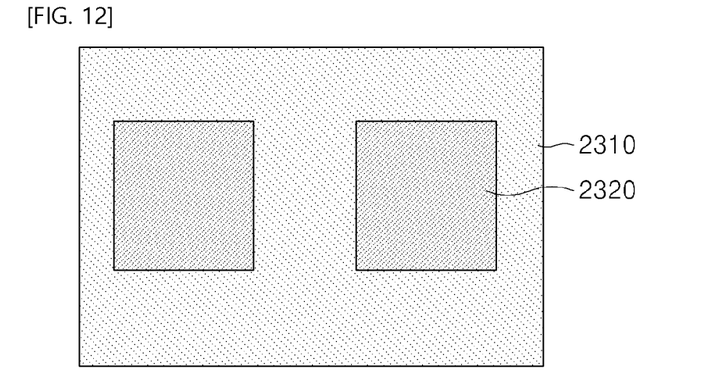
FIG. 12 is a conceptual top view illustrating a state before a lithium foil is installed on an electric member according to the second embodiment of the present invention.

For example, according to the second embodiment of FIG. 11, in the pre-lithiation of the negative electrode 120 of the negative electrode structure 10, the pre-lithiation may be discontinuously performed. In other words, the large-area negative electrode 120 on which the pre-lithiation process is ended may include a plurality of pre-lithiated areas, and the pre-lithiated areas may be disposed to be spaced apart form each other with a non-pre-lithiated area therebetween. In other words, the large-area negative electrode structure 10 on which the pre-lithiation process is ended may be patterned to have the plurality of pre-lithiated areas spaced part from each other.

Here, each of the plurality of pre-lithiated areas may have a surface area having the same as or corresponding to the negative electrode unit 100 to be used in the secondary battery to be manufactured. Thereafter, if the pre-limitation having the patterned structure is ended, when the negative electrode structure is cut along the pre-lithiated areas (see C in FIG. 11), the negative electrode unit 100 according to the first embodiment is provided in plurality as illustrated in FIG. 1.

As described above, to perform the pre-lithiation through the method for patterning the negative electrode structure 10 as described in the second embodiment of FIG. 11, a lithium foil 2300 that is patterned as described in the second embodiment of the FIGS. 9, 10, and 12 is prepared. That is, in the lithium roll 2000 according to the second embodiment, the lithium film 2320 is not formed on an entire one surface of the support 2310, but the lithium film 2320 having the surface area similar to or the same as that of the negative electrode unit 100 to be produced is formed in plurality on the support 2310 so that the plurality of lithium films 2320 are spaced apart from each other in one direction.

Here, each of the plurality of lithium films 2320 may have a surface area less than that of the negative electrode unit 100 to be produced. This is because lithium ions are diffused when the lithium ions are injected due to a potential difference between the one surface of the negative electrode 120 and the lithium film 2320 of the lithium roll 2000, which come into contact with each other.

According to the lithium roll 2000 as described above, while the negative electrode structure passes between the lithium roll 2000 and the support roll 3000, contact between one surface of the negative electrode 120 and a predetermined area of the lithium film 2320 and non-contact between one surface of the negative electrode 120 and a predetermined area of the lithium film 2320 are alternately repeated several times. Thus, as illustrated in FIG. 11, as the pre-lithiation is discontinuously performed on the large-area negative electrode 120, the negative electrode 120 may be pre-lithiated in the pattern shape. When the pre-lithiation of the negative electrode structure 10 is ended, cutting is performed with respect to the pre-lithiated area (see C in FIG. 11), and thus, the negative electrode unit 100 is provided in plurality as described in the first embodiment.

When the negative electrode structure 10 is pre-lithiated, the pre-lithiation is performed into the pattern structure so that the pre-lithiation is performed by an area used as the negative electrode unit 100 of the secondary battery. Thus, when the secondary battery is actually manufactured, since an area that does not act as the negative electrode 120 is not pre-lithiated, consumption of a lithium material for forming the lithium film 230 on the lithium foil 2300 may be reduced.

In the abovementioned second embodiment, the pre-lithiation is performed through the patterning method so that the plurality of pre-lithiated areas are spaced apart from each other, and the pre-lithiated areas are patterned to have the area corresponding to or having the same surface area as the negative electrode unit to be produced.

However, the present invention is not limited thereto. For example, the pre-lithiation is performed in the pattern shape, i.e., the negative electrode 120 of the negative electrode unit 100 may be patterned to be divided into the plurality of pre-lithiated areas. That is, the negative electrode 120 may have the plurality of pre-lithiated areas and the plurality of non-pre-lithiated areas, and like the negative electrode structure 10 according to the modified example of the second embodiment of FIG. 5, each of the plurality of pre-lithiated areas may have a surface area that is significantly less than that of the negative electrode unit 100 to be produced, for example, have a surface area of 400 μm² or less.

Thus, as illustrated in FIG. 15, when the negative electrode structure 10 on which the pre-lithiation is ended is cut to have the same area as the negative electrode unit to be produced (see C in FIG. 15), the negative electrode 120 of each of the plurality of negative electrode units 100 may be formed to have the plurality of pre-lithiated areas, each of which has a surface of 400 μm² or less.

As described above, the pre-lithiation of the negative electrode structure 10 is performed to form the pattern, current charging may be concentrated into a portion or a specific area of the negative electrode 120 due to a relative thickness difference of the negative electrode 120 during the contact between the lithium roll 2000 and the negative electrode 120 to prevent or reduce a phenomenon in which the pre-lithiation relatively largely or concentratedly occur, and thus, a thickness deviation and performance deterioration due to the volume expansion of the partial area may be prevented.

As illustrated in FIG. 15, to perform the pre-lithiation through the method for patterning the negative electrode structure 14 as described in the second embodiment of FIG. 15, the lithium foil 2300 that is patterned as illustrated in FIGS. 13, 14, and 16 is prepared. That is, the plurality of lithium films 2320 are discontinuously formed on one surface of the support 2310. Here, each of the lithium films may have a surface area that is significantly less than that of the lithium film 2320 according to the second embodiment, and the plurality of lithium films may be formed on an area corresponding to the negative electrode unit 100 to be produced on the support 2310. Here, one lithium film may have a surface area of 400 μm² or less.

According to the lithium roll 2000 as described above, while the negative electrode structure passes between the lithium roll 2000 and the support roll 3000, contact between one surface of the negative electrode 120 and a predetermined length of the lithium film 2320 and non-contact between one surface of the negative electrode 120 and a predetermined length of the lithium film 2320 are alternately repeated several times. Thus, as illustrated in FIG. 15, as the pre-lithiation is discontinuously performed on the large-area negative electrode 120, the negative electrode 120 may be pre-lithiated in the pattern shape. When the pre-lithiation of the negative electrode structure 10 is ended, cutting is performed according to the surface area of the negative electrode unit of the secondary battery 100 to be manufactured (see C in FIG. 15), and each of the plurality of negative electrode units 100 that are cut to be divided include a plurality of pre-lithiated areas.

As described above, when the pre-lithiation is performed, current charging may be concentrated into a portion or a specific area of the negative electrode 120 due to a relative thickness difference of the negative electrode 120 to prevent or reduce a phenomenon in which the pre-lithiation relatively largely or concentratedly occur, and thus, performance deterioration due to the volume expansion of the partial area may be prevented.

Hereinafter, a thickness deviation of the negative electrode according to first to ten experimental examples will be described with reference to Table 1.

Table 1 shows a thickness deviation of the negative electrode during continuous pre-lithiation, during discontinuous pre-lithiation, and according to a surface area of one pre-lithiated area during the discontinuous pre-lithiation. Hereinafter, 'one lithiated-area' of the plurality of lithiated areas, which are pre-lithiated, during the discontinuous pre-lithiation is called a 'pattern'.

For the experiments, a negative electrode active material was applied to a collector (i.e., a second collector) made of copper and then was dried and rolled. Here, the negative electrode active material may be a mixture containing graphite and SiO, and a mixing ratio of graphite:SiO based on the weight may be 3:5 (graphite:SiO=3:5).

After the negative electrode active material is applied to the collector, pre-lithiation was performed on the negative electrode active layer.

Here, in the first to ninth experimental examples, the pre-lithiation was discontinuously performed to form a plurality of pre-lithiated areas and a plurality of remaining non-pre-lithiated areas, and in the tenth experimental examples, the pre-lithiation was continuously performed.

Also, in the first to ninth experimental examples, when the pre-lithiation is discontinuously performed, areas of the patterns were different from each other, and each of the patterns had a square shape. Thereafter, a thickness for each area or position of the pre-lithiated negative electrode was measured to calculate a deviation between a maximum thickness and a minimum thickness.

$1000a$ and the second roll $1000b$. Here, most of the negative electrode structure 10 including one end thereof is wound around the first roll $1000a$, and the remaining portion including the other end thereof is wound around the second roll $1000b$. Also, a front area of the negative electrode structure 10 including the area or the other end wound around the second roll $1000b$ may be an area on which the pre-lithiation is not initially performed or a surplus area on which the negative electrode active layer is not formed.

Also, each of the first roll $1000a$ and the second roll $1000b$ rotates to allow the negative electrode structure 10 wound around the first roll $1000a$ to move to a direction in which the lithium roll 2000 and the second roll $1000b$ are disposed (S100). That is, the negative electrode structure 10 that is unwound from the first roll $1000a$ may pass between the

TABLE 1

| | First Experimental Example (Pattern Area 25 $\mu m^2$) | Second Experimental Example (Pattern Area 100 $\mu m^2$) | Third Experimental Example (Pattern Area 255 $\mu m^2$) | Fourth Experimental Example (Pattern Area 400 $\mu m^2$) | Fifth Experimental Example (Pattern Area 625 $\mu m^2$) | Sixth Experimental Example (Pattern Area 900 $\mu m^2$) | Seventh Experimental Example (Pattern Area 1600 $\mu m^2$) | Eighth Experimental Example (Pattern Area 2500 $\mu m^2$) | Ninth Experimental Example (Pattern Area 10000 $\mu m^2$) | Tenth Experimental Example (No Pattern) |
|---|---|---|---|---|---|---|---|---|---|---|
| Thickness Deviation | 2.3 $\mu m$ | 2.2 $\mu m$ | 2.4 $\mu m$ | 2.3 $\mu m$ | 3.2 $\mu m$ | 5.3 $\mu m$ | 6.4 $\mu m$ | 8.1 $\mu m$ | 9.5 $\mu m$ | 12.7 $\mu m$ |

Referring to Table 1, it is seen that the first to ninth experimental examples in which the pre-lithiation is discontinuously performed has a thickness deviation less than that of the tenth experimental example in which the pre-lithiation is continuously performed. Thus, it is seen that, when the pre-lithiation is discontinuously performed, a phenomenon in which the pre-lithiation excessively occurs at a specific position to expand a volume is prevented.

Also, when compared with the first to ninth experimental examples in which the pre-lithiation is discontinuously performed, if the pattern surface area is less than 400 $\mu m^2$ as described in the first to fourth experimental examples, the thickness deviation is less than 2.5 $\mu m$, and an increase in thickness deviation due to the increase of the surface area is less. However, as described in the fifth to ninth experimental examples, it is seen that, when the pattern surface area exceeds 400 $\mu m^2$, the thickness deviation exceeds 3 $\mu m$, an increase in thickness deviation due to the increase of the surface area is larger than that of the first to fourth experimental examples. This is because, when the pattern surface area exceeds 400 $\mu m^2$, a degree of concentration of ion or current charging into a specific position or area during the pre-lithiation is large.

Thus, it is seen that, when the surface area of the pattern is less than 400 $\mu m^2$ during the discontinuous pre-lithiation, the phenomenon in which the ion or current charging is concentrated into the specific position or area of the electrode may be effectively prevented to form a more uniform thickness.

Hereinafter, an operation of the pre-lithiation apparatus according to the first embodiment of the present invention and the pre-lithiation method using the same will be described with reference to FIGS. 3 to 5 6B and 17.

First, a large-area negative electrode structure 10 formed on a negative electrode 120 is prepared on a second collector 110. Also, one end of the negative electrode structure 10 is disposed to correspond to a first roll $1000a$, and the other end is disposed to correspond to a second roll $1000b$, and the second collector 110 is tensioned between the first roll lithium roll 2000 and the support roll 3000 and then recovered while being wound around the second roll $1000b$.

When the negative electrode structure 10 pass between the lithium roll 2000 and he support roll 3000, one surface of the negative electrode structure 10, i.e., one surface of the negative electrode 120 comes into contact with a lithium foil 2300, and a back surface of the negative electrode structure 10 comes into contact with the support roll. Here, since the negative electrode of the negative electrode structure 10 has a predetermined voltage, for example, a voltage of 3 V, and the lithium foil has a voltage of 0 V, lithium ions of the lithium foil are injected into the negative electrode due to a potential difference therebetween to react with oxygen of silicon oxide, thereby progressing pre-lithiation for forming lithium oxide (S200).

Here, since the negative electrode structure 10 comes into contact with the lithium roll 2000 and the support roll 3000 while moving, and a pressure is applied to the lithium roll 2000 and the support roll 3000, the pre-lithiation stably occurs, and a pre-lithiation rate is improved when compared with a case in which the pressure is not applied.

Also, since the lithium roll 2000 according to an embodiment includes an elastic member 2200 between a rotation body and the lithium foil 2300, even through the negative electrode 120 has a somewhat nonuniform thickness, or a predetermined position of the negative electrode 120 protrudes, the pre-lithiation may be performed without a gap or empty. That is, as illustrated in FIG. 6B, the lithium foil corresponding to an area having a relatively thick thickness of the area of the negative electrode 120, which corresponds to a lower side of the lithium roll 2000 and the elastic member 2200 are compressed to be recessed inward. Thus, the entire area of the negative electrode 120 corresponding to the lower side of the lithium roll 2000 may come into contact with the lithium foil 2300, and thus, the pre-lithiation may be uniformly performed on the large-area negative electrode.

As described above, the pre-lithiation is performed on the entire area of the negative electrode, as illustrated in FIGS.

1 to 5, according to the shape of the lithium roll 2000 or the lithium foil 2300 according to the first embodiment. Thereafter, when the negative electrode structure 10 is cut into a predetermined area (see C in FIG. 5) (S300), a plurality of negative electrode units 100 are provided, and each of the negative electrode units 100 is laminated on a separator 300 and a positive electrode 100 to manufacture a secondary battery.

INDUSTRIAL APPLICABILITY

According to the pre-lithiation apparatus according to the embodiment of the present invention, the process time for pre-lithiating the negative electrode may be reduced when compared with the related art, and thus, the production rate may be improved. Also, the lithium roll may include the elastic member to uniformly perform the lithiation thoroughly. Also, the negative electrode structure may be pre-lithiated in the patterning manner to reduce the amount of lithium consumed in the lithium roll by reducing the pre-lithiation of the area except for the area used as the negative electrode unit of the battery.

The invention claimed is:

1. A pre-lithiation apparatus that pre-lithiates a negative electrode structure having a first surface on which a negative electrode is disposed to produce a negative electrode unit of a battery, the pre-lithiation apparatus comprising:
   a first roll rotatable to wind or unwind the negative electrode structure therearound or therefrom before the pre-lithiation is performed;
   a second roll installed to be spaced apart from the first roll and rotatable to wind and collect the negative electrode structure, on which the pre-lithiation is performed, therearound; and
   a lithium roll crossing a direction in which the negative electrode structure is transferred from the first roll to the second roll and disposed between the first roll and the second roll to come into contact with at least one of a first surface and a second surface of the negative electrode structure while being transferred from the first roll to the second roll,
   wherein the lithium roll comprises:
      a rotation body that is rotatable as the negative electrode structure is transferred, the rotation body having an inner diameter greater than zero and an outer diameter;
      an elastic member surrounding an outer circumferential surface of the rotation body, the elastic member having an inner diameter equal to the outer diameter of the rotation body; and
      a lithium foil on which a lithium film for pre-lithiating the negative electrode is formed on an outer circumferential surface of the elastic member.

2. The pre-lithiation apparatus of claim 1, wherein the lithium foil is disposed to surround an outer circumferential surface of the elastic member.

3. The pre-lithiation apparatus of claim 1, wherein the elastic member comprises a silicon pad.

4. The pre-lithiation apparatus of claim 1, wherein the lithium foil comprises a support extending along an outer circumferential surface of the elastic member to surround the outer circumferential surface of the elastic member, and
   the lithium film is disposed on an entire one surface of the support.

5. The pre-lithiation apparatus of claim 1, wherein the lithium foil comprises a support extending along an outer circumferential surface of the elastic member to surround the outer circumferential surface of the elastic member, and
   the lithium film is provided as a plurality of lithium films discontinuously disposed on one surface of the support to constitute a pattern.

6. The pre-lithiation apparatus of claim 5, wherein each of the plurality of lithium films has a surface area corresponding to a surface area of the negative electrode unit to be produced.

7. The pre-lithiation apparatus of claim 5, wherein each of the plurality of lithium films has a surface area less than a surface area of the negative electrode unit to be produced, and
   a plurality of discontinuous lithium films of the plurality of lithium films is disposed on an individual area corresponding to the negative electrode unit on the support.

8. The pre-lithiation apparatus of claim 7, wherein each of the plurality of discontinuous lithium films has a surface area of 400 μm$^2$ or less.

9. A method of producing a negative electrode unit of a secondary battery, the method comprising:
   a negative electrode structure transfer process of transferring a negative electrode structure, in which a negative electrode is formed, in one direction so that an electrolyte is provided on a collector formed to extend in the one direction;
   a negative electrode pre-lithiation process of allowing at least one surface of the negative electrode to come into contact with a lithium film formed on an outer circumferential surface of a lithium roll while transferring the negative electrode structure to pre-lithiate the negative electrode of the negative electrode structure; and
   a negative electrode unit formation process of cutting the negative electrode structure on which the pre-lithiation of the negative electrode is performed to produce a plurality of negative electrode units,
   wherein, in the pre-lithiation process, an elastic member disposed inside the lithium roll is pressed in a direction towards a rotation axis of the lithium roll according to a thickness of one surface of the negative electrode coming into contact with the lithium film to minimize a gap between the at least one surface of the negative electrode and the lithium film.

10. The method of claim 9, wherein, the lithium film is continuously formed, and
    in the negative electrode pre-lithiation process, the contact between the at least one surface of the negative electrode and the lithium film is performed by allowing the at least one surface of the negative electrode to come into contact with the continuously formed lithium film.

11. The method of claim 10, wherein, in the lithium contact process, the continuously formed lithium film is continuously formed on the outer circumferential surface of the lithium roll installed on a path along which the negative electrode structure is transferred.

12. The method of claim 9, wherein, in the negative electrode pre-lithiation process, a pre-lithiated area that is patterned so that pre-lithiated areas and non-pre-lithiated areas are alternately repeated is formed on the one surface of the negative electrode.

13. The method of claim 12, wherein the formation of the patterned pre-lithiated area is performed so that the negative electrode structure transferred in the one direction comes into contact with the lithium roll on which the lithium film is provided in plurality and that are discontinuously patterned on the outer circumferential surface of the lithium roll to form a plurality of discontinuous pre-lithiated areas on the negative electrode structure.

14. The method of claim 13, wherein each of the plurality of pre-lithiated areas has a surface area corresponding to that of the negative electrode unit to be produced.

15. The method of claim 13, wherein each of the plurality of lithium films has a surface area less than that of the negative electrode unit to be produced, and
in the negative electrode structure, a pattern of the pre-lithiated areas is formed so that pre-lithiated areas and non-pre-lithiated areas are alternately repeated several times within an individual area corresponding to the negative electrode unit to be produced.

16. The method of claim 15, wherein each of the plurality of pre-lithiated areas has a surface area of 400 $\mu m^2$ or less.

17. The method of claim 9, wherein the negative electrode of the negative electrode structure is made of a material comprising silicon oxide (SiO).

18. A negative electrode unit of a secondary battery, comprising:
a collector having a predetermined area; and
a negative electrode coated with silicon oxide on at least one surface of the collector and comprising an electrolyte,
wherein at least one surface of the negative electrode is discontinuously pre-lithiated so that lithiated areas and non-pre-lithiated areas of the negative electrode are alternately repeated several times.

19. The negative electrode unit of claim 18, wherein the negative electrode is made of a material comprising silicon oxide (SiO).

20. The negative electrode unit of claim 18, wherein, in the alternately repeated shape of a plurality of times of the pre-lithiated areas and non-pre-lithiated areas, each of the pre-lithiated areas has a surface area of 400 $\mu m^2$ or less.

* * * * *